(12) United States Patent
Smith et al.

(10) Patent No.: US 8,881,764 B2
(45) Date of Patent: Nov. 11, 2014

(54) OFFSET AMBIENT LEVEL FUEL FEED SYSTEM

(75) Inventors: David R. Smith, West Haven, CT (US); Joe James Burg, West Palm Beach, FL (US); Robert R. Rogstad, Woodstock, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 330 days.

(21) Appl. No.: 12/991,946

(22) PCT Filed: Dec. 30, 2008

(86) PCT No.: PCT/US2008/088507
§ 371 (c)(1),
(2), (4) Date: Nov. 10, 2010

(87) PCT Pub. No.: WO2009/139801
PCT Pub. Date: Nov. 19, 2009

(65) Prior Publication Data
US 2012/0111417 A1    May 10, 2012

Related U.S. Application Data

(60) Provisional application No. 61/052,962, filed on May 13, 2008.

(51) Int. Cl.
| | |
|---|---|
| *F02M 37/20* | (2006.01) |
| *F02C 7/236* | (2006.01) |
| *B64D 37/00* | (2006.01) |
| *B64D 37/14* | (2006.01) |
| *B64D 37/04* | (2006.01) |

(52) U.S. Cl.
CPC .............. *F02C 7/236* (2013.01); *B64D 37/00* (2013.01); *F05D 2220/329* (2013.01); *B64D 37/14* (2013.01); *B64D 37/04* (2013.01)
USPC ...... 137/565.01; 123/509; 123/514; 123/516; 244/135 R

(58) Field of Classification Search
USPC ............. 123/509, 510, 514, 516; 137/565.01, 137/565.23, 587; 244/135 R
See application file for complete search history.

(56) References Cited

U.S. PATENT DOCUMENTS 2,215,469 A * 9/1940 Janssen ................... 123/516
3,938,322 A    2/1976 Turner
(Continued)

FOREIGN PATENT DOCUMENTS

| | | |
|---|---|---|
| EP | 0161813 | 11/1985 |
| GB | 818653 | 4/1957 |
| GB | 1598555 | 9/1981 |
| KR | 10-0660684 B1 | 12/2006 |

OTHER PUBLICATIONS

Search Report and Written Opinion mailed on Jan. 13, 2010 for PCT/US2008/088507.

(Continued)

*Primary Examiner* — Stephen M Hepperle
*Assistant Examiner* — R. K. Arundale
(74) *Attorney, Agent, or Firm* — Carlson, Gaskey & Olds, P.C.

(57) ABSTRACT

A fuel system for an aircraft includes a fuel collector downstream of a boost pump and upstream of an engine fuel pump.

25 Claims, 4 Drawing Sheets

(56) References Cited

U.S. PATENT DOCUMENTS

| | | | |
|---|---|---|---|
| 4,024,849 A | 5/1977 | Hoots | |
| 4,031,876 A | 6/1977 | Hoots | |
| 4,033,706 A | 7/1977 | Schaefer et al. | |
| 4,214,721 A | 7/1980 | Burhans, Jr. et al. | |
| 4,275,860 A | 6/1981 | Brabazon | |
| 4,339,917 A | 7/1982 | LaGrone | |
| 4,524,744 A * | 6/1985 | Adams | 123/459 |
| 4,704,070 A | 11/1987 | Iseman | |
| 4,813,445 A | 3/1989 | Lu | |
| 4,897,994 A | 2/1990 | Shekleton | |
| 4,913,380 A | 4/1990 | Vardaman et al. | |
| 4,920,740 A | 5/1990 | Shekleton | |
| 5,020,315 A | 6/1991 | Leachman, Jr. et al. | |
| 5,050,567 A * | 9/1991 | Suzuki | 123/514 |
| 5,116,362 A | 5/1992 | Arline et al. | |
| 5,220,793 A | 6/1993 | McGlone et al. | |
| 5,371,935 A | 12/1994 | Furs et al. | |
| 5,372,005 A | 12/1994 | Lawler | |
| 5,488,933 A | 2/1996 | Pham | |
| 5,490,387 A | 2/1996 | Bissom et al. | |
| 5,528,897 A | 6/1996 | Halin | |
| 5,605,135 A | 2/1997 | Netherwood | |
| 5,740,784 A * | 4/1998 | McKinney | 123/509 |
| 5,776,341 A | 7/1998 | Barnard et al. | |
| 5,924,445 A | 7/1999 | Ambrose et al. | |
| 6,273,165 B1 | 8/2001 | Gundersen et al. | |
| 6,439,506 B1 | 8/2002 | Schlegel et al. | |
| 6,598,830 B1 | 7/2003 | Ambrose et al. | |
| 6,729,138 B2 | 5/2004 | Noussitou et al. | |
| 6,810,671 B2 | 11/2004 | Hansen | |
| 6,892,710 B2 * | 5/2005 | Ekstam | 123/514 |
| 7,007,452 B1 | 3/2006 | Baryshnikov et al. | |
| 7,131,274 B2 | 11/2006 | Baryshnikov et al. | |
| 7,231,768 B2 | 6/2007 | Spadaccini et al. | |
| 7,431,015 B2 | 10/2008 | Mahoney et al. | |
| 7,441,548 B1 * | 10/2008 | Onishi et al. | 123/509 |
| 2004/0025847 A1 * | 2/2004 | Kaneko et al. | 123/458 |

OTHER PUBLICATIONS

Extended European Search Report for EP 08 87 4326 dated May 10, 2013.

* cited by examiner

OFFSET AMBIENT LEVEL FUEL FEED SYSTEM

The present disclosure claims priority to U.S. Provisional Patent Application Ser. No. 61/052,962, filed May 13, 2008.

STATEMENT REGARDING FEDERALLY SPONSORED RESEARCH OR DEVELOPMENT

This invention was made with Government support under N00019-06-C-0081 awarded by The United States Navy. The Government has certain rights in this invention.

BACKGROUND

The present application relates to a fuel system, and more particularly to an aircraft suction fuel system.

A rotary-wing aircraft fuel system communicates fuel from the aircraft fuel tanks to the engine packages. Various components within the fuel system maintain each fuel line section outside the fuel tank in suction such that the static pressure in the fuel line segments outside the tank are maintained below the ambient air pressure. In such conventional suction fuel feed systems, an engine fuel pump alone draws fuel from the fuel tank to the engine package. With such a suction feed system, should a fuel line outside the fuel tank develop a leak or be ruptured due to ballistic damage, air is drawn into the fuel line rather than a fuel leak or spray out of the fuel line which would occur if the fuel line was positively pressurized.

While desirable, conventional suction fuel feed systems may have inherent limitations, often due to the volatility of aviation fuels. Aviation fuels tend to outgas fuel vapor and air dissolved in the fuel when the fuel is exposed to a significant suction pressure. The higher the magnitude of the suction pressure acting on the fuel, the more vapor and air dissolved in the fuel will outgas from the fuel. This results in gaseous bubbles in the fuel line. This effect generally increases with increasing fuel temperature and aircraft altitude as the pressure of the fuel vapor and air which outgases from the fuel becomes an increased percentage of the total pressure inside the fuel line.

The fuel vapor and air that outgas from the liquid fuel result in a two-phase liquid-gas flow in the fuel line, generally in the form of bubbles, or, in extreme cases, alternating slugs of air/vapor and liquid fuel in the fuel line. Engine fuel pumps used in suction fuel feed systems are designed to tolerate a certain amount of gaseous air/vapor at the pump inlet, normally expressed as a maximum vapor-to-liquid ratio (V/L) capability of the pump. If the V/L of the fuel at the engine fuel pump inlet exceeds the V/L capability of the pump, the pump will cavitate and will not pump fuel until the excess V/L condition is removed. This may subsequently, depending on the length of time the condition exists, result in engine flame-out.

In rotary-wing aircraft suction fuel feed systems, fuel pressure at the engine package fuel inlet is reduced relative to the fuel pressure in the fuel tank due to the pressure drop in the fuel line. The pressure drop in the fuel line is generally the sum of the dynamic pressure losses and the head loss. The dynamic pressure losses result from fuel flow through the fuel line and may include, for example, frictional losses, bend losses, expansion losses, contraction losses, etc. Dynamic losses increase with increased fuel flow. In conventional suction fuel feed systems, head loss is based on the vertical height of the engine fuel pump inlet above the fuel level in the fuel tank. Head loss is highest when the fuel tank is at minimum fuel levels. During aircraft maneuvers, the normal 1-g head loss is multiplied by the number of g's experienced.

One challenge in the design of rotary-wing aircraft fuel systems is to maintain the pressure drop in the fuel line low enough to maintain fuel V/L at the engine fuel pump inlet within the engine fuel pump V/L capability throughout the aircraft flight envelope. If design constraints of the fuel line, such as the line height, length, maximum allowable line diameter and high-g capability preclude operation within the maximum V/L limit over a portion of the flight envelope with the engine fuel pump alone drawing fuel from the fuel tank, some form of pumping assistance may be required.

The conventional suction fuel system approach to such pumping assistance is through operation of one or more airframe-supplied fuel boost pumps, either within the fuel tank or in the fuel line section between the tank and the engine package. Such pumping assistance has conventionally caused a situation in which, when one or more boost pumps are turned on, some or all of the fuel line between the fuel pump and the engine package is positively pressurized at some operating conditions and the benefits of a suction fuel system may be lost in some or all of the fuel line.

SUMMARY

A fuel system for an aircraft according to an exemplary aspect of the present invention includes a fuel collector downstream of a boost pump and upstream of an engine fuel pump.

A method of communicating fuel within an aircraft according to an exemplary aspect of the present invention includes offsetting a fuel collector from a fuel tank bottom surface and receiving fuel pumped by a boost pump into the fuel collector.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
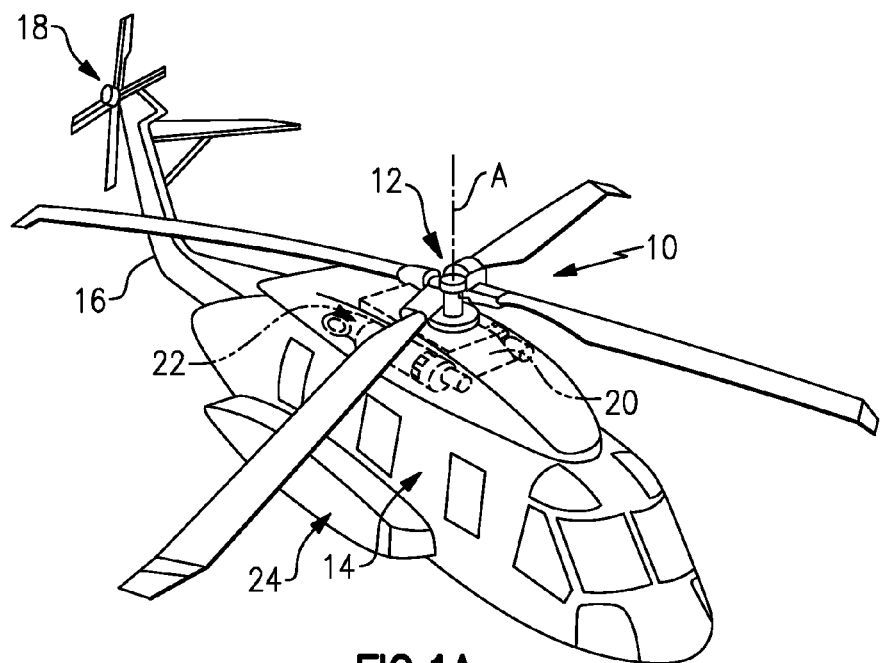
FIG. 1A is a general perspective view of an exemplary rotary wing aircraft embodiment for use with the present invention.

FIG. 1A schematically illustrates a rotary-wing aircraft 10 having a main rotor system 12. The aircraft 10 includes an airframe 14 having an extending tail 16 which mounts an anti-torque system 18. The main rotor assembly 12 is driven about an axis of rotation (A) through a main rotor gearbox (MGB) 20 by a multi-engine powerplant system 22—here having two engine packages ENG1, ENG2. The multi-engine powerplant system 22 is integrated with the MGB 20 which drives the main rotor assembly 12 and the anti-torque system 18. Although a particular Rotary-wing aircraft configuration is illustrated and described in the disclosed embodiment, other configurations and/or machines, will also benefit herefrom.

Figure 1B:
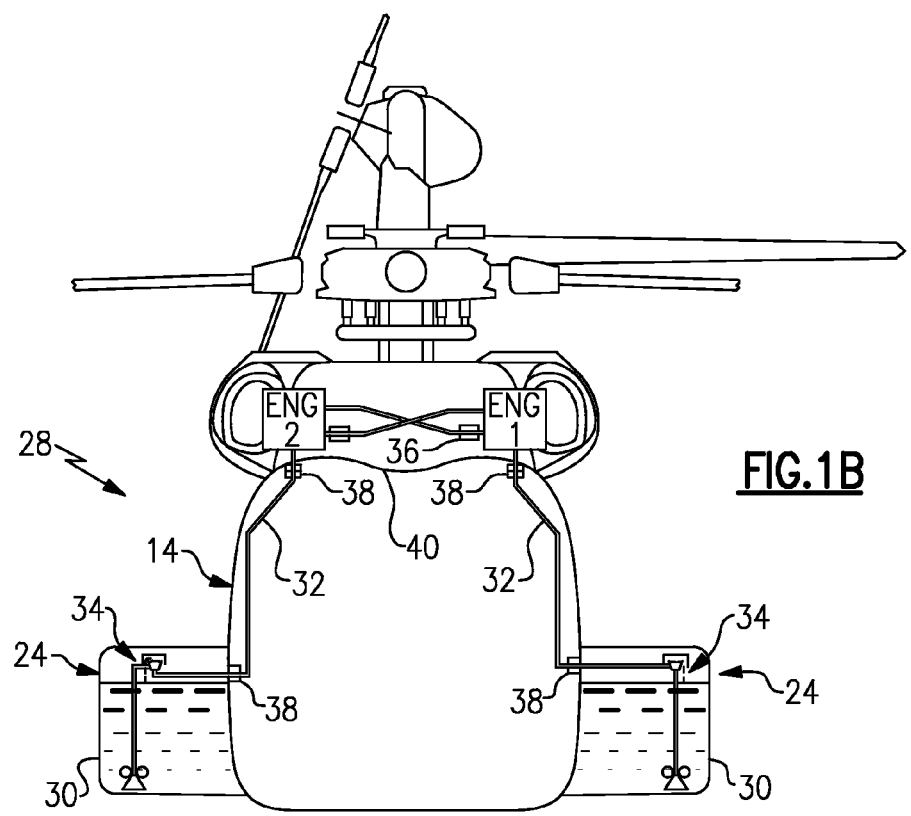
FIG. 1B is a general schematic front view of an exemplary rotary wing aircraft embodiment for use with the present invention.

Referring to the FIG. 1B, the aircraft 10 includes a fuel system 28 which moves fuel from fuel tank 30 to the multi-engine powerplant system 22 through fuel lines 32 and offset ambient fuel collectors 34. The fuel lines 32 shown in FIG. 1B include both direct feed and crossfeed fuel line sections. Each fuel tank 30 may be located in a respective sponson 24 mounted to a respective port and starboard side of the airframe 14. As generally understood, each fuel tank 30 may be crashworthy, self-sealing, interchangeable and generally contain a pressure refuel/defuel valve, fuel quantity sensors, low-level sensors, high-level shutoff valves, low-level shutoff valves, check valves, sump drains, as well as other fuel communicate components which need not be further described herein.

The fuel system 28 also includes an engine fuel pump 36 adjacent each engine package ENG1, ENG2. The fuel system 28 also includes self-sealing break-away valves 38 located, for example, adjacent to each respective fuel tank 30 and upper deck structure 40. It should be understood that other fuel tank arrangements and locations will be benefit herefrom and the illustrated non-limiting arrangement disclosed herein is typical of one rotary wing aircraft.

The offset ambient fuel collector 34 is part of the overall fuel system 28 and is schematically illustrated. The offset ambient fuel collector 34 is generally similar for each fuel tank 30 such that only one need be described in detail herein. It should be understood that the offset ambient fuel collector 34 may be of various sizes, lengths, and designs, for example, the offset ambient fuel collector 34 may integrate the fuel line section 54A and essentially extend along a significant height of the fuel tank 30.

Figure 2:
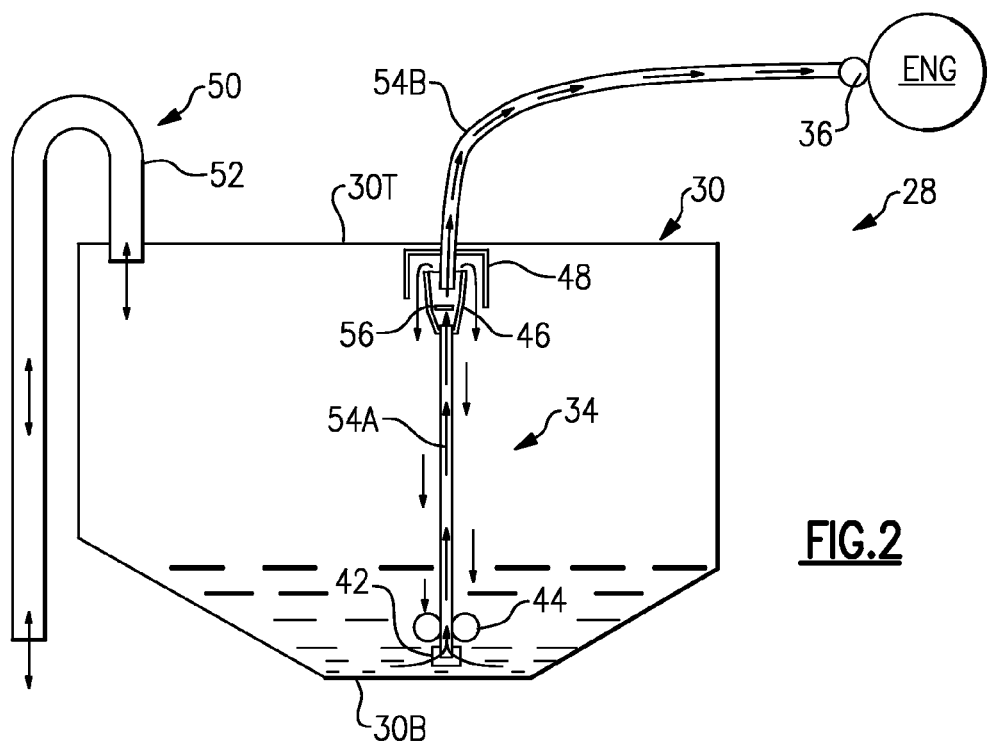
FIG. 2 is a schematic view of a suction fuel system with an in-take fuel collector which raises the effective fuel level relative to an engine pump at a full-tank level regardless of usable fuel level in the fuel tank according to one non-limiting embodiment of the present invention.

Referring to FIG. 2, the fuel system 28 generally includes a check-valve-strainer assembly 42 or "foot" valve, a fuel boost pump 44, a fuel collector 46 and an inverted fuel collector 48 contained within the fuel tank 30. A vent system 50 includes a vent line 52 which extends from the fuel tank 30.

Fuel enters the suction fuel system 28 via the foot valve 42 and flows through a fuel line section 54A from the fuel boost pump 44 to the fuel collector 46. The fuel boost pump 44 operates continuously and may be implemented as a dual redundant pump system. The fuel boost pump 44 is located near a bottom 30B of the fuel tank 30 to minimize size and power requirements. The fuel boost pump 44 is sized to provide a fuel flow greater than the maximum required fuel flow from the fuel tank 30 under any operational condition inclusive of total cross-feed flow to all engine packages ENG1, ENG2 of the multi-power plant system 22 from each single fuel tank 30 to overflow the fuel collector 46. A baffle 56 may be located within the fuel collector 46 to at least partially disperse the fuel flow from the fuel line section 54A.

Figure 3:
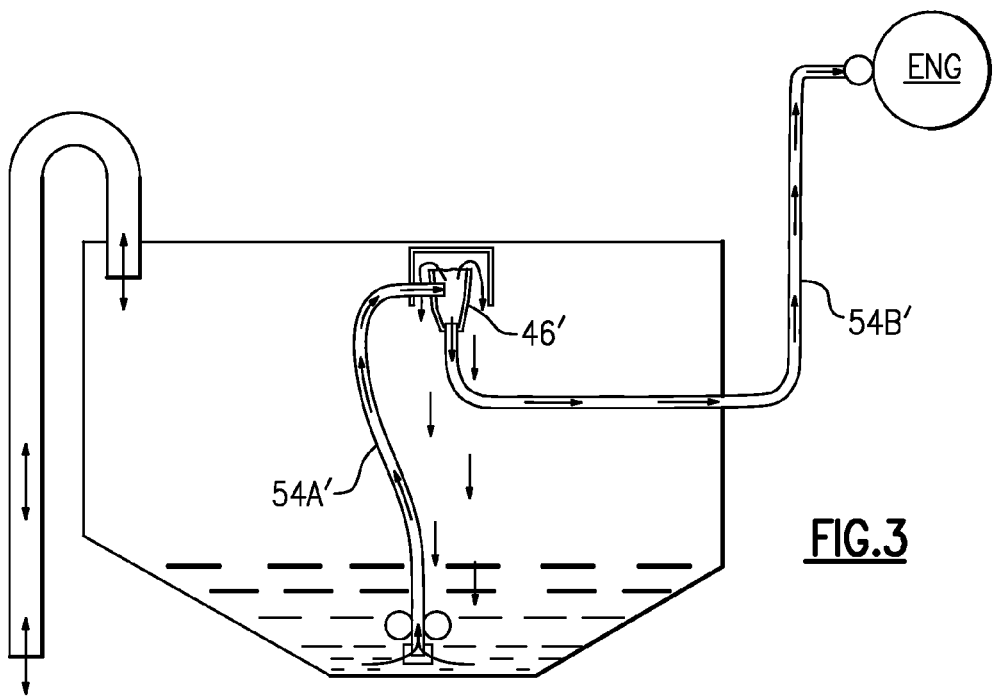
FIG. 3 is a schematic view of another suction fuel system with an in-take fuel collector which communicates through a side wall of a fuel tank according to another non-limiting embodiment.

The fuel line section 54A communicates fuel from the fuel boost pump 44 through a base of the fuel collector 46. Alternatively, the fuel line section 54A' communicates fuel from the fuel boost pump 44 through a side-wall of the fuel collector 46' (FIG. 3). The fuel collector 46 is located at the downstream end of the fuel line section 54A and vented to the near-ambient fuel tank ullage pressure. Tank "ullage" as utilized herein is the air volume above the fuel level in the fuel tank 30.

The fuel collector 46 is of an open bowl shape so as to collect fuel therein, yet permit fuel to continuously overflow therefrom. That is, the fuel overflows the fuel collector 46 and flows back into the fuel within the fuel tank 30. The fuel collector 46 is mounted adjacent to a top 30T of the fuel tank 30.

A fuel line section 54B carries fuel from the fuel collector 46 to the engine fuel pump 36. The fuel line section 54B receives fuel from the fuel collector 46. FIGS. 2 and 3 illustrate other exemplary configurations of the fuel collector 46. Other variations are possible, including any fuel collector 46 arrangement which raises the level of fuel from which the engine fuel pump 36 draws fuel.

The fuel collector 46 maintains the fuel level from which the engine fuel pump 36 draws fuel near the top 30T of the fuel tank 30 regardless of the actual fuel level within the fuel tank 30 whenever the fuel level in the fuel tank 30 is below the top of the collector 46. That is, the effective fuel tank 30 fuel level is the location of the top of the fuel collector 46, not the level of fuel within the fuel tank 30.

The engine fuel pump 36 draws fuel from the fuel collector 46 to thereby assure that the entire fuel line section 54B which extends outside the fuel tank 30 operates in suction. That is, the static pressure of the fuel in fuel line section 54B is below the ambient air pressure. As the entire fuel line section 54B operates in suction, should the fuel line section 54B develop a leak or be ruptured due to ballistic damage, air would be drawn into the fuel line section 54B rather than the fuel leak or spray out if the fuel line was positively pressurized.

The inverted fuel collector 48 extends over the fuel collector 46. The inverted fuel collector 48 is immediately above and may at least partially surround the fuel collector 46. The inverted fuel collector 48 collects fuel in the event of a negative-g maneuver so as to maintain a supply of fuel into the fuel line section 54B.

The fuel collector 46 reduces the overall fuel head from the height differential between the engine fuel pump 36 and the fuel level inside the fuel tank 30—which varies from the full-tank level to the level of the foot valve 42 entrance as fuel is consumed—to the fuel height differential between the engine fuel pump 36 and the top of the collector 46 so as to remain constant as fuel is consumed. If that reduction of head is sufficient to maintain the fuel line pressure drop to the engine fuel pump 36 within the pressure drop limit associated with the engine fuel pump 36 vapor-to-liquid (V/L) ratio limit at all aircraft operating conditions, particularly at maximum maneuvering g-loads, then the in-tank fuel collector 46 is operationally sufficient.

Figure 4A:
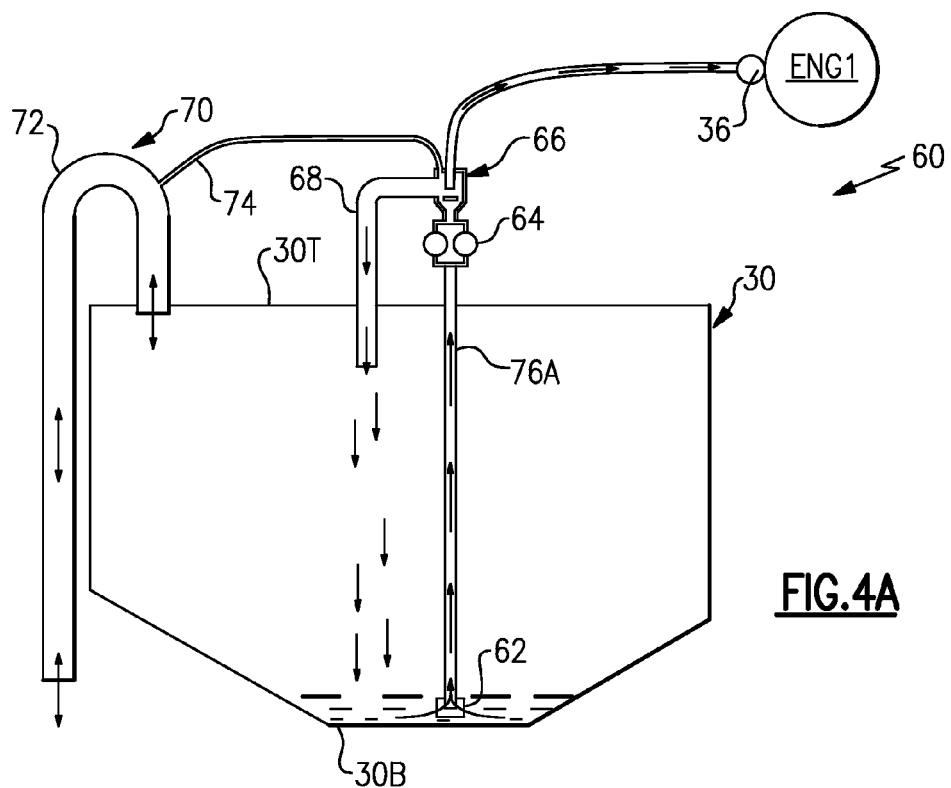
FIG. 4A is a schematic view of another suction fuel system with a fuel collector external to the fuel tank according to another non-limiting embodiment of the present invention.

Referring to FIG. 4A, a portion of another fuel system configuration 60 in which the fuel collector 66 is located outside and above the fuel tank 30 is schematically illustrated. If the head reduction achievable via the in-tank fuel collector 46 (FIG. 3) is not sufficient to meet the engine fuel pump 36 V/L requirements throughout the required aircraft flight envelope, then the fuel system configuration 60 shown in FIG. 4A may be used to meet the engine fuel pump 36 V/L requirements.

In this external fuel collector 66 approach, the fuel collector 66 operates generally the same as the in-tank collector bowl 46 (FIGS. 2 and 3) insofar as it reduces the head acting on the engine fuel pump 36 relative to a conventional suction feed system without the fuel collector 66. However, locating the fuel collector 66 above the fuel tank 30 raises the fuel level exposed to near-ambient pressure to a higher level than would be possible with the fuel collector located inside the fuel tank 30. This further reduces the head from the fuel collector 66 to the engine fuel pump 36. The fuel collector 66 is located at a height in a fuel line section 76A such that the head between the fuel level in the fuel collector 66 and the engine fuel pump 36 is reduced sufficiently to meet the engine fuel pump 36 V/L requirements throughout the flight envelope.

Figure 5:
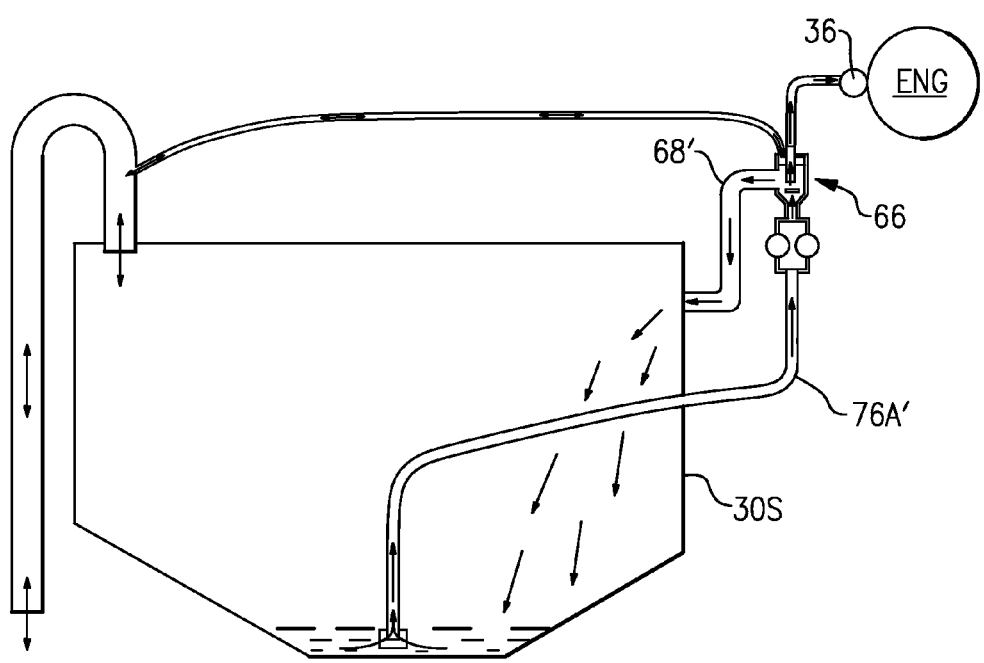
FIG. 5 is a schematic view of a suction fuel system with a fuel collector external to the fuel level which communicates through a side wall of a fuel tank according to another non-limiting embodiment.

The fuel feed system 60 generally includes a check-valve assembly 62 or "foot" valve contained within the fuel tank 30, a fuel boost pump 64, a fuel collector 66 and a fuel return line 68 external to fuel tank 30. A vent system 70 includes an overboard vent line 72 that allows air to flow into and out of the fuel tank 30 such that the ullage space is maintained at near-ambient pressure. An anti-siphon vent line 74 permits air to flow into and out of the collector 66 to maintain the air space in the collector 66 at near-ambient pressure. A fuel line section 76A and the fuel return line 68 may exit the fuel tank 30 through a top 30T thereof or through a side 30S thereof, as shown in FIG. 5.

The fuel boost pump 64 is located in the fuel line section 76A immediately below the fuel collector 66. This maintains the fuel line section 76A below the fuel boost pump 64 in suction under all operating conditions. Only the relatively short distance from the fuel boost pump 64 to the fuel collector 66 is not in suction and this interface may be integrated to avoid adding a pressurized section of fuel line between the boost pump 64 and the collector 66. Additionally, the fuel boost pump 64 to the fuel collector 66 may be a single armored assembly to provide significant ballistic tolerance. The fuel return line 68 carries fuel which overflows the fuel collector 66 back into the fuel tank 30.

The anti-siphon vent line 74 connects the fuel collector 66 to the fuel tank side of the vent line 72 to maintain the pressure in the fuel collector 66 at near-ambient pressure during all operating conditions.

The fuel boost pump 64 is sized to provide a fuel flow greater than the maximum required fuel flow from the fuel tank 30 under any operational condition inclusive of total cross-feed flow to all engine packages ENG1, ENG2 of the multi-power plant system 22 from each single fuel tank 30. The fuel flow into the collector 66 which exceeds the fuel flow to the engine fuel pumps 36 drawing fuel from that collector 66 overflows back into the fuel tank 30 through the fuel return line 68. The fuel return line 68 is sized to carry the full flow of the fuel boost pump 64 back into the fuel tank 30 with minimum pressure loss such that the overflow fuel drains freely back into the fuel tank 30.

The engine fuel pump 36 draws fuel from the fuel collector 66 to thereby assure that the fuel line section 76B operates in suction. That is, the static pressure of the fuel line section 76B is below the ambient air pressure. Should the fuel line section 76B develop a leak or be ruptured due to ballistic damage, air would be drawn into the fuel line section 54B rather than fuel leaking or spraying out of the fuel line 76B which might occur if the fuel line was positively pressurized.

Figure 4B:
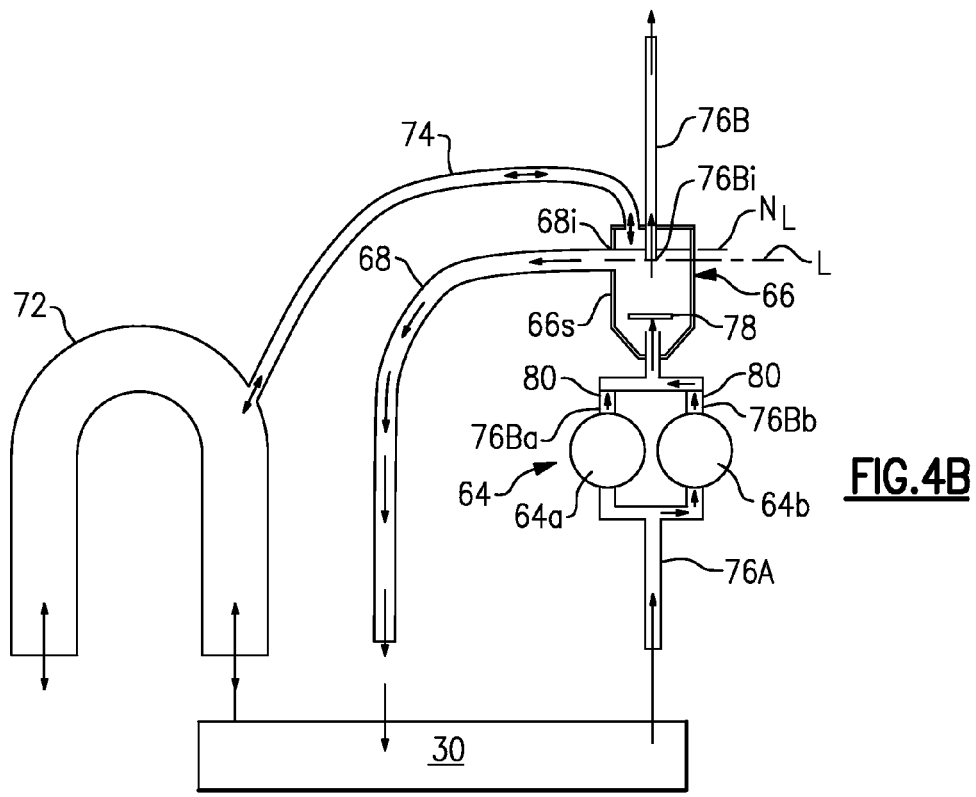
FIG. 4B is an expanded schematic view of the fuel collector of FIG. 4A.

Referring to FIG. 4B, an inlet 76Bi to the fuel line section 76B inside the fuel collector 66 may be located at the approximate center height (illustrated schematically by line L) of an inlet 68i to the fuel return line 68 in a side 66S of the fuel collector 66. The volume above the normal fuel level ($N_L$) in the fuel collector 66 may be somewhat less than the volume below the fuel level $N_L$ in the fuel collector 66. This assures that the inlet 76Bi remains within the fuel in the fuel collector 66 in the event of a negative-g maneuver, in which case, the fuel would collect in the top of the fuel collector 66.

A baffle 78 may be located within the fuel collector 66 to at least partially disperse the fuel flow inside the collector 66.

The fuel boost pump(s) 64 may include dual redundant airframe mounted fuel boost pumps in which check valves 80 are located in each fuel line section 76Ba, 76Bb from each fuel boost pump 64a, 64b.

Referring to FIG. 5, the fuel line section 76A' and the fuel return line 68' penetrate a side wall 30S of the fuel tank 30 as might be used in some rotary-wing aircraft where the fuel tanks 30 are located in external sponsons (FIG. 1B).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A fuel system for an aircraft comprising:
   a boost pump;
   an engine fuel pump; and
   a fuel collector downstream of said boost pump and upstream of said engine fuel pump, wherein said engine fuel pump is spaced from said fuel collector, wherein said fuel collector operates at a near-ambient fuel tank ullage pressure and said engine fuel pump is located outward from an outer surface of said fuel collector.

2. The system as recited in claim 1, wherein said fuel collector is mounted within a fuel tank.

3. The system as recited in claim 2, wherein said boost pump is mounted within said fuel tank, with said boost pump upstream of said fuel collector.

4. The system as recited in claim 3, further comprising a foot valve upstream of said boost pump.

5. The system as recited in claim 4, further comprising a fuel line section which communicates with said boost pump and extends through a base of said fuel collector.

6. The system as recited in claim 5, further comprising a second fuel line section which extends into an open top of said fuel collector.

7. The system as recited in claim 4, further comprising a fuel line section which communicates with said boost pump and extends through a side wall of said fuel collector.

8. The system as recited in claim 7, further comprising a second fuel line section which extends through a base of said fuel collector, said second fuel line section extends through a side-wall of said fuel tank.

9. The system as recited in claim 1, further comprising an inverted fuel collector adjacent said fuel collector to collect fuel under negative g operations, said fuel collector and said inverted fuel collector within said fuel tank.

10. The system as recited in claim 1, wherein said fuel collector is mounted external to a fuel tank.

11. The system as recited in claim 10, wherein said fuel collector is directly downstream of said boost pump.

12. The system as recited in claim 10, further comprising a fuel return line which communicates fuel from said fuel collector to said fuel tank.

13. The system as recited in claim 12, further comprising an anti-siphon vent line which communicates between a vent line in communication with said fuel tank and said fuel collector.

14. The system as recited in claim 10, wherein said boost pump is mounted external to said fuel tank, said boost pump upstream of said fuel collector.

15. The system as recited in claim 1, wherein said boost pump is spaced from said fuel collector.

16. The system as recited in claim 1, wherein said boost pump is located outward from an outer surface of said fuel collector.

17. The system as recited in claim 1, wherein said fuel collector forms an enclosure and said engine fuel pump is spaced from said enclosure.

18. The system as recited in claim 1, wherein said engine fuel pump is spaced from said boost pump.

19. The system as recited in claim 1, wherein the fuel collector includes a fuel inlet and a fuel outlet and the fuel outlet is located on an opposite side of the collector from the fuel inlet.

20. The system as recited in claim 1, wherein a fuel outlet is adjacent an upper portion of the fuel collector.

21. The system as recited in claim 1, wherein the fuel collector defines a cavity and the engine fuel pump is located outward of the cavity.

22. The system as recited in claim 1, including a second fuel collector spaced from the fuel collector and inverted relative to the fuel collector and a fluid passaged defined by an inner surface of the second fuel collector and an outer surface of the fuel collector.

23. A method of communicating fuel within an aircraft comprising:
   offsetting a fuel collector from a fuel tank bottom surface;
   receiving fuel pumped by a boost pump into the fuel collector, wherein said boost pump is spaced from the fuel collector;
   operating the fuel collector at a near-ambient fuel tank ullage pressure; and
   locating an engine fuel pump outward from an outer surface of said fuel collector.

24. The method as recited in claim 23, locating the fuel collector within the fuel tank.

25. The method as recited in claim 23, locating the fuel collector external to the fuel tank, the boost pump which maintains the boost pressure, directly upstream of the fuel collector.

* * * * *